UNITED STATES PATENT OFFICE.

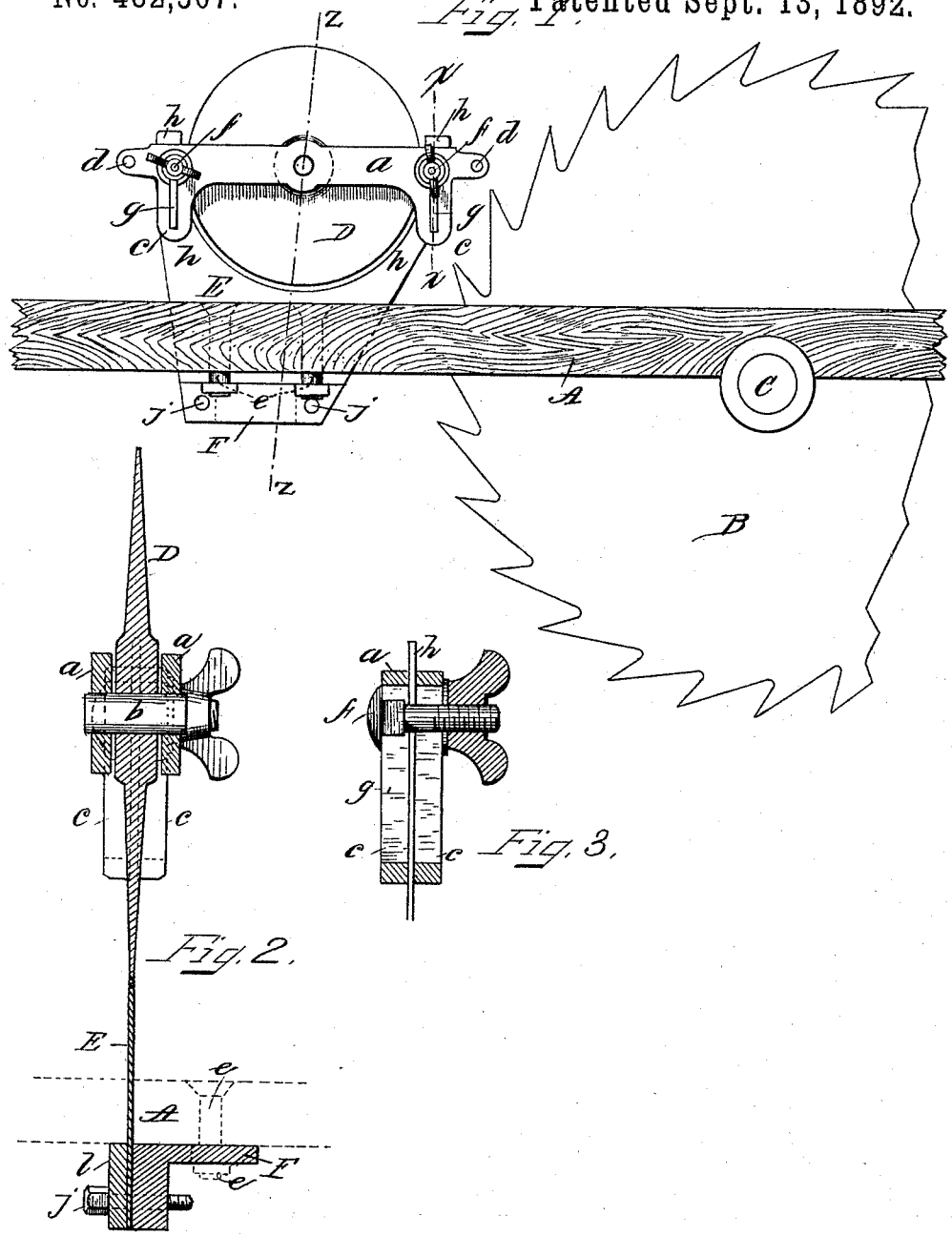

JOSEPH M. FOSTER, OF BOSTON, MASSACHUSETTS, ASSIGNOR OF ONE-HALF TO ROBERT BRUCE, OF SAME PLACE.

KERF-SPREADER.

SPECIFICATION forming part of Letters Patent No. 482,507, dated September 13, 1892.

Application filed August 6, 1891. Serial No. 401,884. (No model.)

*To all whom it may concern:*

Be it known that I, JOSEPH M. FOSTER, of Boston, in the county of Suffolk and State of Massachusetts, have invented a new and useful Improvement in Kerf-Spreaders, which will, in connection with the accompanying drawings, be hereinafter fully described, and specifically defined in the appended claims.

In said drawings, Figure 1 is a side elevation showing a saw-table, a circular saw, and my invention as secured to said table in proper operative relation to the saw. Fig. 2 is an enlarged vertical section taken on line Z, Fig. 1; and Fig. 3 is a like section taken on line X, Fig. 1.

The object of my invention is to provide an improved saw-guard and kerf-spreader which will also prevent detached pieces of timber from being brought in contact with the teeth of the saw on the upward-moving side; and it consists in features of novelty and the combination thereof, as will be next herein described, and then specified in the appended claims.

Referring again to said drawings, A represents the saw-table. B is the saw, and C the saw-arbor, which may be journaled in any known manner, and D is the disk-like kerf-spreader, thicker at its center and thinner at its periphery, which is a well-known form. Said spreader is supported upon its pivot *b*, secured in the supporting-bars *a a*, which at their ends are secured together by screws or rivets *d*, and they are vertically adjusted and secured in position by means of screw-bolts *f*, which pass through the slots *g* in ears *c* of said bars, as also through a hole in the arms *h* of the thin sheet-steel standard E, which is supported in and secured to table A by means of angle-iron F, which is bolted to the under side of the table by bolts *e*, and the clamping-bar secured in position by bolts *j*, which pass through said bar and the standard and are threaded in part F. By means of slots *g* in bars *a* and the clamping-bolts *f* the kerf-spreader D may be adjusted at such height as the thickness of the piece being sawed may render necessary, and by having standard E of a thickness somewhat less than the kerf and arranged in the same vertical plane as the saw it is practical to arrange it so near to the saw that detached pieces of the wood being sawed cannot by any accident or carelessness get between the spreader and the saw, so as to be caught and thrown violently in the direction of the person operating the machine, which often results in severe or fatal casualties. By arranging the kerf-spreader D above the piece being sawed instead of below it, it is thereby held to the table, which is advantageous.

I claim as my invention—

1. In a kerf-spreader, the combination of standard E, formed of thin metal and secured to the table, so as to extend up through the kerf of the saw, and the disk D, diminished in thickness at its periphery and supported by said standard above the piece to be sawed and so as to extend down into the kerf thereof, substantially as specified.

2. In a kerf-spreader, the combination of the thin-metal standard adapted to be arranged in the line of the plane of the saw and to be secured to the table below the plane thereof, the bar *a*, secured to said standard, and the disk D, pivoted in said bar above the piece being sawed and so as to extend down into the kerf thereof, substantially as specified.

3. In a kerf-spreader, the combination, with standard E, adapted to be secured to the table, of the bar *a*, supporting the disk D above the piece to be sawed and provided with the slots *g*, whereby said disk may be vertically adjusted according to the thickness of the piece to be sawed, substantially as specified.

JOSEPH M. FOSTER.

Witnesses:
T. W. PORTER,
EUGENE HUMPHREY.